United States Patent [19]
Johnson

[11] 4,094,514
[45] June 13, 1978

[54] METAL ALLOY COMPOSITION WITH IMPROVED WEAR RESISTANCE

[75] Inventor: Donald L. Johnson, Rolling Meadows, Ill.

[73] Assignee: Chicago Rawhide Manufacturing Company, Elgin, Ill.

[21] Appl. No.: 855,216

[22] Filed: Nov. 28, 1977

[51] Int. Cl.² .................. C22C 38/18; F16J 15/28; F16J 15/32
[52] U.S. Cl. .................. 277/92; 277/96.2; 277/224; 277/236; 277/DIG. 6; 75/126 A
[58] Field of Search .................. 305/11–13; 277/81 R, 83, 84, 88, 89, 92, 96, 96.2, 165, 223, 224, DIG. 6, 236; 75/126 A

[56] References Cited

U.S. PATENT DOCUMENTS

| | | | |
|---|---|---|---|
| 3,086,782 | 4/1963 | Peickii et al. | 277/92 |
| 3,241,843 | 3/1966 | Hatch et al. | 277/92 |
| 3,392,984 | 7/1968 | Reinsma et al. | 305/11 |
| 3,692,515 | 9/1972 | Fletcher et al. | 75/126 A |
| 3,940,154 | 2/1976 | Olsson | 277/92 |

FOREIGN PATENT DOCUMENTS

| | | | |
|---|---|---|---|
| 2,504,483 | 8/1976 | Germany | 75/126 A |
| 168,322 | 6/1965 | U.S.S.R. | 75/126 A |

*Primary Examiner*—Robert S. Ward, Jr.
*Attorney, Agent, or Firm*—James T. FitzGibbon

[57] ABSTRACT

A ferrous metal alloy and a heavy-duty grit seal having an annular ring made from the alloy. In the preferred form, the alloy includes from about 3.10% to about 3.35% carbon, not more than 1.00% manganese, from about 0.75% to about 1.40% silicon, from about 16.5% to about 19.0% chromium, from about 0.75% to about 2.00% vanadium, from about 2.5% to about 4.0% molybdenum, from about 0.25% to about 1.25% cobalt, from about 1.75% to about 3.00% tungsten, not more than 0.040% phosphorous, not more than 0.040% sulfur, and the remainder being iron. The alloy, when used as a seal ring, provides performance which is nearly as good as extremely costly, specially cast, high performance, wear resistant alloys and does so at greatly reduced cost. The alloy is highly abrasion resistant and withstands severe conditions of mechanical shock and extreme temperature ranges without embrittlement.

9 Claims, 4 Drawing Figures

METAL ALLOY COMPOSITION WITH IMPROVED WEAR RESISTANCE

BACKGROUND OF THE INVENTION

The present invention relates generally to mechanical seals, and more particularly, to rotary end face seals designed for use in severe environments in which the primary seal is formed between mating faces of two metal seal rings of special alloy compositions lying in opposed relation to each other and making contact along a seal band portion formed on parts of the respective radially extending end faces of the seal rings. Seals made according to the present invention are an improvement over known heavy duty grit seals of a similar nature, such as seals of the types shown in U.S. Pat. No. 3,241,843, and other patents.

Seals of this type are commonly used to exclude grit, water and the like from stationary and rotatable members in severe service environments, such as those encountered by earthmoving vehicles where the track rollers, idlers and final drive system may be exposed to mud, dust, sand, or rock at temperatures which may reach the extremes found in either the deserts or the artic regions. Such seals perform their primary sealing function under these conditions, both because the end faces are precisely finished and because the seal rings themselves are accurately positioned and loaded by elastomeric rings of various configurations, with such rings also applying the desired loading forces, forming a secondary seal, and providing sufficient driving torque so that relative rotation occurs only at the primary seal faces of the seal rings and not between the seal rings and the elastomer or between the elastomer and another part of the sealed mechanism.

In order to function successfully under these relatively severe conditions, the seal rings must not only possess strength, corrosion resistance, and abrasion resistance, but also must be able to withstand the shock normally associated with earthmoving operations, even when carried out at subzero temperatures. Accordingly, the metal ring portions of heavy duty seals are normally made of metal alloy compositions containing elements such as cobalt, molybdenum, and vanadium which are relied upon to impart the desired properties to the seals. However, the main disadvantage encountered in the use of these alloys is their relatively high cost. Inasmuch as the service life of the seal rings made from such high cost alloys often exceeds the actual service life of the components associated therewith, many seals using these alloys are prohibitively expensive for many applications.

In view of the need for an improved moderately priced seal and for an alloy composition from which such seals can be made, it is an object of the present invention to provide an improved, inexpensive alloy composition having high strength, high corrosion and abrasion resistance, and high impact strength over a wide range of temperatures.

It is a further object of the present invention to provide a seal ring made from such improved, inexpensive alloy composition.

A still further object of the invention is to provide a track roller having seals made from an improved alloy composition.

Another object is to provide an alloy composition and a track roller having a seal ring made from such composition, with the composition being characterized by a service life which is exceptionally long in relation to the cost of the material from which the metal rings are made.

Yet another object is to provide a metal composition which has outstanding wear resistance but which is sufficiently economical so that seal rings of substantial cross section can be made therefrom without incurring undue expense.

A still further object is to provide a seal ring having a service life which is nearly as long as the service life of the best seal rings heretofore known but which can be made at a fraction of the cost of such seals.

Another object is to provide primary seal rings made from high performance, low cost alloys, which seal rings can be used interchangeably with prior art seal rings, that is, to provide a primary seal ring which may be used with secondary seal rings of existing designs, thereby providing flexibility in the manufacture and inventory control of complete seal assemblies.

It is a further object of the present invention to provide a seal ring comprising, in weight percent, from about 3.0 percent to about 4.0 percent carbon, not more than 1.5 percent manganese, from about 0.5 percent to about 2.0 percent silicon, from about 15.0 percent to about 20.0 percent chromium, from about 0.5 percent to about 2.5 percent vanadium, from about 2.0 percent to about 5.0 percent molybdenum, from about 0.25 percent to about 1.75 percent cobalt, from about 1.5 percent to about 3.5 percent tungsten, the remainder of the composition being iron, with the alloy containing a minimum amount of impurities.

It is a further object of the present invention to provide a seal assembly having seal rings comprised of the improved metal alloy.

It is a further object of the present invention to provide a track roller assembly having seals which include seal rings made from the improved alloy.

The exact manner in which these and other objects of the invention are achieved will become more readily apparent when reference is made to the following detailed description of the preferred embodiments of the invention set forth by way of example and shown in the accompanying drawings in which like reference numbers indicate corresponding parts throughout the several figures.

DESCRIPTION OF THE PREFERRED EMBODIMENTS OF THE INVENTION

While it will be understood that the improved seal of the present invention may be embodied in different forms and applied to different end uses, for purposes of illustration, the seals described herein are so-called two-piece seals having a metal primary seal ring portion and a rubber ring portion which serves several important purposes.

Figure 1:
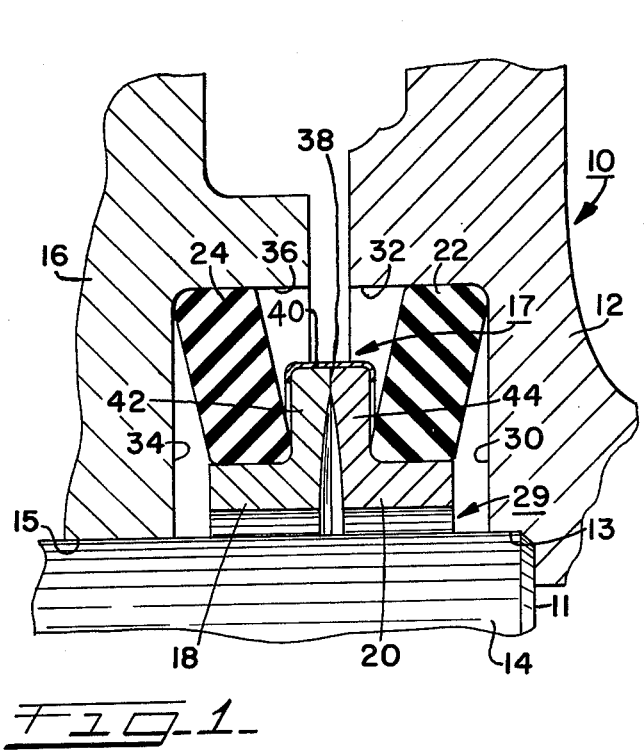
FIG. 1 is a vertical sectional view of a part of a machine showing one form of a seal made according to the invention disposed in a desired position of use.

Referring now to the drawings in greater detail, FIG. 1 illustrates a portion of a track roller generally designated 10 and shown to include an axially extending shaft 14 received within a bore or opening 15 in a machine member 16. The end portion 11 of the shaft 14 is press fit within opening 13 in end cap 12 which is received over the shaft end portion 11.

Lying radially outwardly of the shaft 14 is a lubricant receiving cavity generally designated 29 and defined in part by the seal assembly 17 and by walls 30, 34, respectively, in the end cap 12 and machine member 16. Axially extending cylindrical walls 32, 36 in the end cap 12 and machine member 16, respectively, further define the seal receiving area with such walls 32, 36 being concentrically aligned and having the same diameters.

As shown in FIG. 1, the seal assembly 17 itself consists of a pair of metal primary annular seal members or seal rings 18, 20 and a pair of elastomeric secondary sealing and driving members or rings 22, 24.

Each of the secondary seal rings 22, 24 is made from a synthetic elastomeric material and, in the embodiment depicted in FIG. 1, is of a generally frusto-conical shape and has a generally parallelogram-shaped cross section. Due to the elastomeric characteristics of the material, the cross sectional configurations of the rings change upon installation and during use in a manner which, in cooperation with their associated machine members 12, 16 and seal rings 20, 18, forms a tight, torque-transmitting interference fit therebetween and simultaneously creates the axial load required to create an effective seal.

In the embodiment of FIG. 1, the primary seal or so-called seal band itself is formed at the interface 38 lying between two oppositely directed end face sealing surface portions lying initially adjacent the radially extending outer portions 42, 44 of the primary seal rings 18, 20. As is known in the art, in the case of seals manufactured in this way, wear occurring during the continued use of the seal will cause the seal band 38 to move gradually inwardly and yet permit a tight seal to be maintained between the rings 18, 20.

It will be noted that seals of the type shown in FIG. 1 possess the additional advantage of being able to be protectively unitized by means of a retaining band 40 such as that referred to in U.S. Pat. No. 3,241,843.

As referred to above, the severe service environments to which seals of this type are exposed require the use of materials possessing physical properties which will enable the seals to withstand the effects of heat, cold, corrosion, abrasion, and high static and impact loadings. In the past, specially made but commercially available alloys such as "Haynes 93" alloy have proven suitable in such applications. This alloy is known to possess the approximate composition set forth in Table I.

TABLE I

|  | Approximate Percentage by Weight |
|---|---|
| Cobalt | 6.5 |
| Vanadium | 1.9 |
| Molybdenum | 16.0 |
| Chromium | 17.0 |
| Carbon | 3.0 |
| Iron | Balance |

While seal rings made of this material have proven highly satisfactory in service, they are exceedingly costly due to the incorporation therein of such alloying elements as cobalt, vanadium, molybdenum, and chromium. Seals made of this material are highly unusual in that they have repeatedly demonstrated a service life which far exceeds the service life of the components they are designed to seal and protect.

The seals produced according to the present invention differ from those known in the art in that they contain significantly lower quantities of cobalt, vanadium, and molybdenum. Seal rings according to the invention were made from an alloy consisting of 3.25 percent carbon, 0.50 percent manganese, 1.10 percent silicon, 17.5 percent chromium, 1.25 percent vanadium, 3.25 percent molybdenum, 0.40 percent cobalt, 2.25 percent tungsten, and the balance iron. The cast seal rings thus formed were finish ground and subjected to standard metallurgical evaluation, "mud-box" tests, and field performance evaluation on vehicles. These tests proved conclusively that the alloy of the invention was highly satisfactory for making special purpose seals. The alloy possessed a suitable microstructure, demonstrating a surface hardness of about 63 or more on the Rockwell "C" scale. While not as hard as the above-mentioned "Haynes 93" alloy, which typically exhibits surface hardnesses of about 67 (Rockwell "C"), the improved alloy is, by virtue of its lower hardness, less expensive to finish process; and, while the service life of the improved alloy when used under the above-described conditions is necessarily lower than the service life of seal rings made from the "Haynes 93" alloy, it is more than adequate for the severe use for which it is intended, and will last as long as all but the most long-lived sealed mechanism it protects.

One of the principal advantages of the improved seals made according to the present invention rests in the significant reduction in cost brought about by the reduction of essential, high priced alloying elements used in the alloy formulation.

Figure 2:
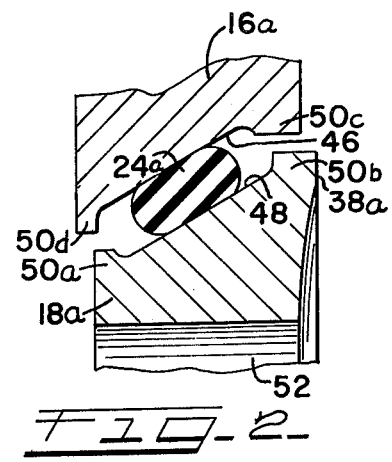
FIG. 2 is a fragmentary sectional view of a modified form of seal made according to the invention.
Figure 3:
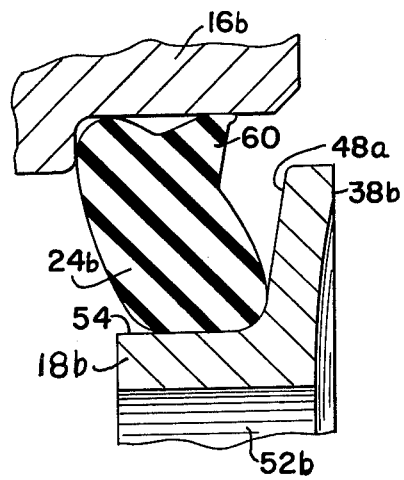
FIG. 3 is a fragmentary sectional view of another modified form of seal made according to the invention.
Figure 4:
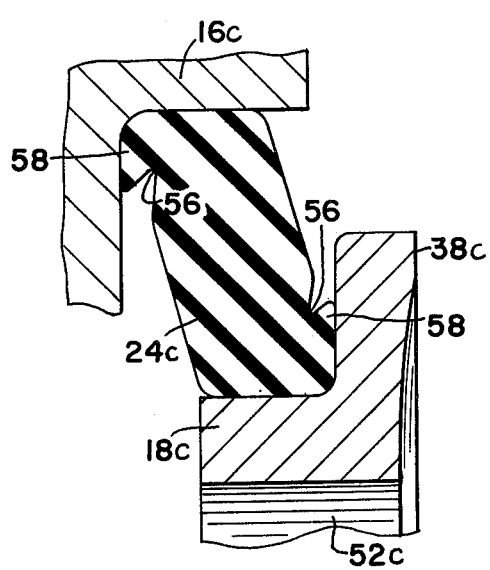
FIG. 4 is a fragmentary sectional view of still another modified form of seal made according to the present invention.

Referring now to FIGS. 2-4, the principles of the invention are shown to be applied to other forms of two-piece seal assemblies.

FIG. 2 shows one-half of a mirror image seal design wherein the primary seal ring 18a includes an axially extending inner surface 52 and an interface or seal band portion 38a. In the construction of FIG. 2, the secondary seal member 24a is in the form of a flattened or so-called toric O-ring adapted to roll up and down on the seal ring 18a as the seal moves in and out under initial load and dynamic conditions. The seat for receiving the secondary sealing and driving member 24a comprises an inclined ramp surface 48, and its counterpart on machine member 16a is likewise an inclined ramp surface 46. Small flanges 50a, 50b, 50c, and 50d are provided respectively on the seal ring 18a and machine member 16a to limit movement of the member 24a.

FIG. 3 shows one part of a mirror image type seal which is similar to that shown in FIGS. 1 and 2 except that the shape of the elastomeric secondary seal member 24b differs therefrom in detail. The seal ring 18b in FIG. 3 includes the axial surface 52b, the interface or seal band portion 38b, and radial and axial surfaces 48a, 54 adapted to receive secondary seal member 24b. In the form of seal illustrated in FIG. 3, surfaces 48a, 54 are separated by an angle somewhat greater than 90°. While the secondary seal member 24b is not shown as being precisely in the shape of a parallelogram, the member 24b does, in use, engage both the radial and axial surfaces 48a, 54 on seal ring 18b and the counterpart radial and axial surfaces of the machine member 16b. A plurality of small conical mounting barbs or studs 60 are shown to be provided in the construction of FIG. 3 to aid in initial placement of the ring 24b.

FIG. 4 shows a seal construction wherein the primary seal ring 18c includes the axial surface 52c and the interface or seal band portion 38c. Both the primary seal ring 18c and the machine member 16c include radial and axial surfaces defining the seal for the elastomeric secondary seal member 24c, whose shape is virtually identical to that of the members 22, 24 shown in FIG. 1, the only difference being the provision of small annular "feet" 58 which engage the radial surfaces of the machine member and seal ring to add shearing stiffness to the member 24c, which, as a whole, would otherwise have reduced stiffness because of the notches 56 therein.

The present invention, heretofore set forth by way of an example of a specific alloy composition, is not limited by nor restricted to that specific composition. It has been found that seal rings made from alloy compositions falling within the ranges established in Table II are also highly satisfactory for making seals which will last several hundred, or even a thousand hours or more, under severe conditions.

What is claimed is:

1. A tough, wear resistant metal alloy composition comprising, in weight percent, from about 3.10% to about 3.35% carbon, not more than 1.00% manganese, from about 0.75% to about 1.40% silicon, from about 16.5% to about 19.0% chromium, from about 0.75% to about 2.00% vanadium, from about 2.5% to about 4.0% molybdenum, from about 0.25% to about 1.25% cobalt, from about 1.75% to about 3.00% tungsten, not more than 0.040% phosphorous, not more than 0.040% sulfur, and the remainder iron.

2. A metal alloy composition as defined in claim 1 wherein said carbon comprises about 3.25%, said manganese comprises about 0.50%, said silicon comprises about 1.10%, said chromium comprises about 17.5%, said vanadium comprises about 1.25%, said molybdenum comprises about 3.25%, said cobalt comprises about 0.40%, said tungsten comprises about 2.25%, all percents being by weight, said composition including not more than 0.040% phosphorous and not more than 0.040% sulfur, the balancing being iron.

3. A seal assembly for at least two relatively movable elements to be sealed, said assembly comprising a primary annular sealing member having a body portion including a generally axially facing, radially directed, primary sealing surface portion, said surface portion having a seal band portion adapted to engage a mating surface when urged axially toward said mating surface, said body portion also including means defining a seat adapted to receive a secondary sealing ring, a secondary sealing ring received in said seat and adapted to urge said primary sealing member axially toward said mating surface and into primary sealing relationship therewith, said secondary sealing ring also adapted to transmit torque from one of said relatively movable elements to said primary sealing member, said secondary sealing ring being also adapted to provide a secondary seal between said one of said relatively movable elements and said primary sealing member, said primary sealing member being made from a relatively hard, wear resistant material comprising, in weight percent, from about 3.10 to about 3.35% carbon, not more than 1.00% manganese, from about 0.75 to about 1.40% silicon, from about 16.5 to about 19.0% chromium, from about 0.75 to about 2.00% vanadium, from about 2.5 to about 4.0% molybdenum, from about 0.25 to about 1.25% cobalt, from about 1.75 to about 3.00% tungsten, not more than 0.040% phosphorous, not more than 0.040% maximum sulfur, the remainder being iron.

4. In a track roller assembly including at least one roller portion having a bore longitudinally disposed therein, a bushing pressed into said bore, said bushing having an inner and an outer diameter, said inner diameter containing a shaft longitudinally, rotatably disposed therein, means forming a reservoir for receiving lubricant, and a seal assembly for retaining said lubricant, said seal assembly including a primary annular seal ring, the improvement comprising making said sealing ring from a composition comprising in weight percent, from about 3.10 to about 3.35% carbon, not more than 1.00% manganese, from about 0.75 to about 1.40% silicon, from about 16.5 to about 19.0% chromium, from about 0.75 to about 2.00% vanadium, from about 2.5 to about 4.0% molybdenum, from about 0.25 to about 1.25% cobalt, from about 1.75 to about 3.00% tungsten, not more than 0.040% phosphorous, not more than 0.040 percent sulfur, the remainder being iron.

5. A track roller assembly comprising, in combination, at least one roller portion having a bore longitudinally disposed therein, a bushing pressed into said bore, said bushing having an inner and an outer diameter, said inner diameter containing a shaft longitudinally, rotatably disposed therein, means forming a reservoir for receiving lubricant, and a seal assembly for retaining said lubricant, said seal assembly comprising a primary annular seal member having a body portion including a generally axially facing, radially directed, primary sealing surface portion, said surface portion having a seal band portion adapted to engage a mating surface when urged axially toward said mating surface, said body portion also including means defining a seat adapted to receive a secondary sealing ring, a secondary sealing ring received in said seat and adapted to urge said primary sealing member axially toward said mating surface and into primary sealing relationship therewith, said secondary sealing ring being also adapted to transmit torque from one of said relatively movable elements to said primary sealing member, said secondary sealing ring being also adapted to provide a secondary seal between said one of said relatively movable elements and said primary sealing member, said primary sealing member being made from a relatively hard, wear resistant material comprising in weight percent, from about 3.10 to about 3.35% carbon, not more than 1.00% manganese, from about 0.75 to about 1.40% silicon, from about 16.5 to about 19.0% chromium, from about 0.75 to about 2.00% vanadium, from about 2.5 to about 4.0% molybdenum, from about 0.25 to about 1.25% cobalt, from about 1.75 to about 3.00% tungsten, not more than 0.040% phosphorous, not more than 0.040% maximum sulfur, the remainder being iron.

6. A seal assembly as defined in claim 3 wherein said secondary seal means is made entirely from an elastomeric material.

7. A seal assembly as defined in claim 6 wherein said secondary seal members is in the form of a Belleville washer, having a parallelogram shaped cross section with inclined front and rear surface portions, and wherein said seat portion is defined by axial and radial surfaces disposed at generally right angles to each other.

8. A seal assembly as defined in claim 6 wherein said secondary seal means is in the form of an O-ring, and wherein said seat portion is in the form of an inclined ramp comprised of a single annular surface and facing outwardly and rearwardly of said axially facing, radially directed surface portion of said primary sealing member.

9. A seal assembly as defined in claim 6 wherein said secondary seal means is generally in the form of a parallelogram, said seal means having areas of reduced cross section near its inner and outer ends, and further having areas of increased cross sections lying outwardly of said reduced cross section areas.

* * * * *